G. W. Hildreth,
Bread Cutter.
Nº 45,409. Patented Dec. 13, 1864.
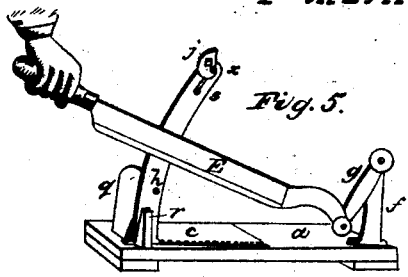
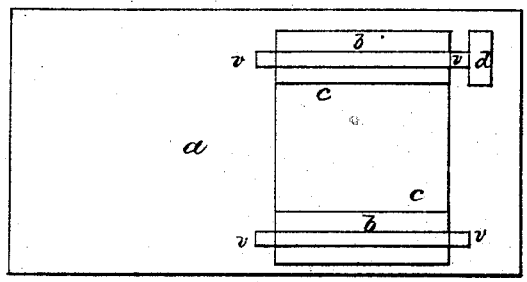
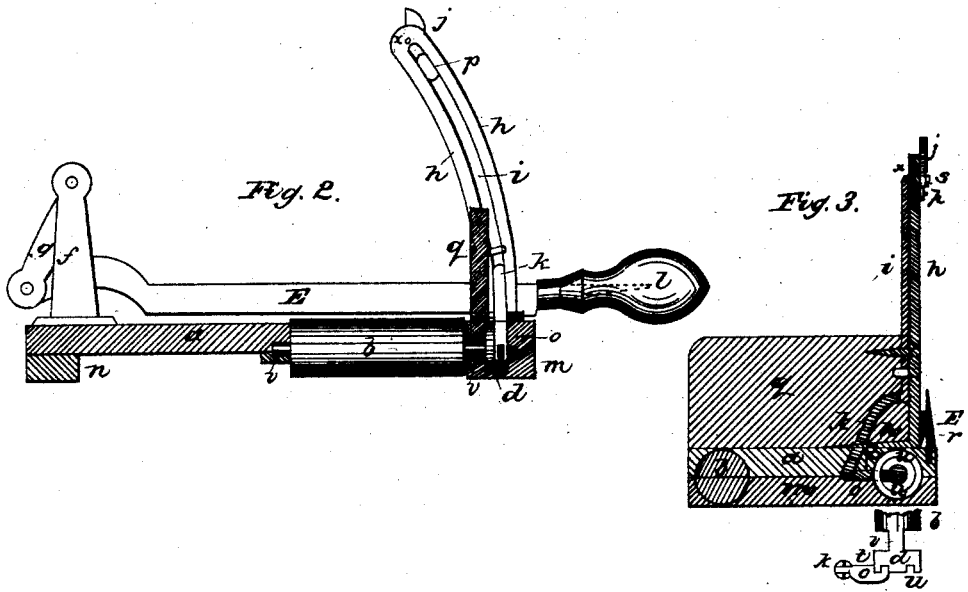
Witnesses
Daniel McHim
Joseph Clark
Inventor
G. W. Hildreth

UNITED STATES PATENT OFFICE.

G. W. HILDRETH, OF LOCKPORT, NEW YORK.

IMPROVED BREAD-SLICER.

Specification forming part of Letters Patent No. 45,409, dated December 13, 1864.

*To all whom it may concern:*

Be it known that I, GEORGE W. HILDRETH, of Lockport, in the county of Niagara, in the State of New York, have invented a Machine for Cutting Dried Beef, Bread, Cabbage, Ice, &c.; and I do hereby declare that the following is a full and exact description thereof, reference being had to the accompanying drawings, and to the letters of reference marked thereon, which refer to the same parts in the various figures.

Figure 1 is a plan. Fig. 2 is a side elevation. Fig. 3 is a transverse section. Fig. 4 is also a transverse section. Fig. 5 is a perspective view.

The nature of my invention consists in a vibrating knife hung at one end to the lower end of a pendant swinging from a standard, (attached to said standard, which is above the table or board upon which the bread is placed,) so as to act with the hand which operates the knife, by taking hold of the other end of the knife and cutting the bread by a perpendicular stroke, or by a pushing-and-drawing stroke, as is best adapted to cut the bread or any article you desire to cut; also an automatic feed-motion, by an endless apron passing over two rollers which are moved by the upward motion of the knife when at its highest position for passing the bread under it. The endless apron is moved forward by a connecting-rod running on a curve to the bed of the machine. On the lower end of this connecting-rod is a link and dog, which works in a groove made in a circular plate, which may be called a "smooth ratchet," and which will be more fully explained hereinafter, in referring to the drawings. The amount of feed or thickness of the slice to be cut is governed by an eccentric plate or button at the top of the circular standard or knife-guide, which allows the knife to move the connecting-rod more or less, according to the position of the eccentric, as will be seen plainer in the detailed reference to the drawings.

To enable others skilled in the art to make and use my invention, I will proceed to describe its construction and operation.

Figure 1 is a ground plan showing the table or bed of the machine $a$, to which the machinery is attached, and upon which the knife works; also the rollers $b\ b$, which carry the endless apron $c\ c$, (made of canvas or cloth;) also showing the smooth ratchet-wheel $d$. Fig. 2 is a side elevation showing the bed $a$, roller $b$, smooth ratchet-wheel $d$, knife $e$, pendant standard $f$, pendant $g$, circular-knife-guide $h$, connecting-rod $i$, (extending to lower link of rod $k$,) handle to the knife $l$, cleat or cup ties under bed $m$ and $n$, dog $o$, slot or groove $u$, (for the end of the dog to work in,) and guide-board $q$. Fig. 3 is a transverse section of those parts referred to in Fig. 2, also knife-protector $r$, nut $s$, spring $t$, groove in smooth ratchet-wheel $u$, journal $v$, base of standard or knife-guide $h$. Fig. 4 is the end view of the rollers $b$, as embedded into the bed $a$, and the endless apron $c\ c$. Fig. 5 is a perspective view of the machine in the hand of the operator.

In Fig. 3 will be seen how the dog $o$ works in the smooth ratchet-wheel $d$, which is by a cramp or friction. As the rod $i$ and link $k$ are lowered, the spring $t$ being made fast in the dog $o$, the upper end of the spring strikes against the link $k$, which presses the dog more securely into the wheel $d$ and insures a good hold to commence turning the wheel $d$ upon raising the rod $i$.

The rod, link, and dog always drop down to the same position every time, but are raised only as high as the eccentric $j$ (at the top of the knife-guide) will admit. The upper end of the rod $i$ is bent at right angles with the perpendicular portion of it and passes through the slot in the knife-guide $h$ at $p$, with a nut, S, on the right side, which nut S strikes against the eccentric $j$ and gages the height which the rod rises, and gages the distance which the apron is moved at each time of raising the knife to cut a new slice.

The operation is performed by taking hold of the knife-handle $l$ and placing the bread (or article to be cut) upon the apron $c$. Then pass the knife down with a pushing or drawing stroke (which is allowed by the pendant $g$ being hung on a center pin to the standard $f$ and its lower end hung to the knife $e$.) After cutting the first slice, raise the knife up to strike the nut $s$. Then continue raising the nut $s$ until it strikes the eccentric $j$, which moves the rod $i$ and apron $c$ forward for a new slice, the thickness depending upon the position in which the eccentric $j$ is placed, which turns upon a center pin, $x$, Fig. 5, gaging it to any desired thickness from one-sixteenth of an inch to three fourths of an inch.

This machine has been useful in cutting dried beef, as it gives the operator a leverage or purchase upon the cutting part of the knife and can be forced through much easier than by an ordinary knife. It is also useful in cutting cabbage, cheese, pork, &c., and works admirably in shaving ice, and prepares it in the very best condition for table use or saloons, or any purpose where it is desirable to have it fine.

What I claim as my invention, and desire to secure by Letters Patent, is—

1. The vibrating knife $e$, with one end hung to a pendant, $g$, swinging from a standard, $f$, in combination with the eccentric $j$, connecting-rod $i$, link $k$, dog $o$, and grooved wheel $d$, substantially as and for the purpose specified.

2. The combination of the vibrating knife, connecting-rod, and endless apron for producing an automatic feed-motion, for the purpose specified.

3. The eccentric $j$, in combination with the connecting-rod and knife, to govern the thickness of the slice to be cut, as specified.

G. W. HILDRETH.

Witnesses:
DANIEL McKING,
JOSEPH CLARK.